United States Patent
Shuster et al.

(10) Patent No.: US 8,390,630 B2
(45) Date of Patent: *Mar. 5, 2013

(54) AVATAR EYE CONTROL IN A MULTI-USER ANIMATION ENVIRONMENT

(76) Inventors: Brian Mark Shuster, Vancouver (CA); Gary Stephen Shuster, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,314

(22) Filed: Sep. 4, 2012

(65) Prior Publication Data

US 2012/0327085 A1    Dec. 27, 2012

Related U.S. Application Data

(63) Continuation of application No. 12/141,474, filed on Jun. 18, 2008, now Pat. No. 8,259,117.

(60) Provisional application No. 60/944,723, filed on Jun. 18, 2007.

(51) Int. Cl.
*G06T 13/00* (2011.01)
*G09G 5/00* (2006.01)

(52) U.S. Cl. ........................... 345/474; 345/625

(58) Field of Classification Search ............... None
See application file for complete search history.

(56) References Cited

U.S. PATENT DOCUMENTS

| | | | |
|---|---|---|---|
| 6,219,045 B1 | 4/2001 | Leahy et al. | |
| 6,381,444 B1 | 4/2002 | Aggarwal et al. | |
| 6,545,682 B1 * | 4/2003 | Ventrella et al. | 345/473 |
| 6,767,287 B1 | 7/2004 | Mcquaid et al. | |
| 7,386,799 B1 * | 6/2008 | Clanton et al. | 715/758 |
| 2001/0051989 A1 | 12/2001 | Moncreiff | |
| 2002/0062348 A1 | 5/2002 | Maehiro | |
| 2003/0039945 A1 | 2/2003 | Dang et al. | |
| 2003/0083922 A1 | 5/2003 | Reed | |
| 2003/0139938 A1 | 7/2003 | Meyers | |
| 2003/0151605 A1 | 8/2003 | Dominici | |
| 2004/0015549 A1 | 1/2004 | Saruhashi et al. | |
| 2004/0030781 A1 | 2/2004 | Etesse et al. | |
| 2004/0235564 A1 | 11/2004 | Booth | |
| 2005/0026692 A1 | 2/2005 | Dyl | |
| 2005/0044005 A1 | 2/2005 | Giannini | |
| 2006/0089873 A1 | 4/2006 | Stewart et al. | |
| 2006/0119598 A1 | 6/2006 | Littlefield | |
| 2006/0287072 A1 | 12/2006 | Walker et al. | |
| 2007/0011273 A1 | 1/2007 | Greenstein et al. | |
| 2007/0038559 A1 | 2/2007 | Jung et al. | |
| 2007/0130339 A1 | 6/2007 | Alcorn et al. | |
| 2007/0162547 A1 | 7/2007 | Ross | |
| 2007/0202484 A1 | 8/2007 | Toombs et al. | |
| 2007/0220090 A1 | 9/2007 | Hall | |

(Continued)

FOREIGN PATENT DOCUMENTS

WO    2008109798 A2    9/2008

OTHER PUBLICATIONS

U.S. Appl. No. 60/189,845, filed Mar. 16, 2000, Harron et el.

*Primary Examiner* — Joni Richer
*Assistant Examiner* — Michelle Chin
(74) *Attorney, Agent, or Firm* — Jonathan Jaech; Novak Druce Connolly Bove + Quigg

(57) ABSTRACT

In a multi-participant modeled virtual reality environment, avatars are modeled beings that include moveable eyes creating the impression of an apparent gaze direction. Control of eye movement may be performed autonomously using software to select and prioritize targets in a visual field. Sequence and duration of apparent gaze may then be controlled using automatically determined priorities. Optionally, user preferences for object characteristics may be factored into determining priority of apparent gaze. Resulting modeled avatars are rendered on client displays to provide more lifelike and interesting avatar depictions with shifting gaze directions.

20 Claims, 5 Drawing Sheets

U.S. PATENT DOCUMENTS

| | | |
|---|---|---|
| 2007/0224585 A1 | 9/2007 | Gerteis et al. |
| 2007/0249323 A1 | 10/2007 | Lee et al. |
| 2007/0255805 A1 | 11/2007 | Beams et al. |
| 2008/0064018 A1 | 3/2008 | Griffin |
| 2008/0081701 A1 | 4/2008 | Shuster |
| 2008/0134056 A1 | 6/2008 | Shuster |
| 2008/0158232 A1 | 7/2008 | Shuster |

* cited by examiner

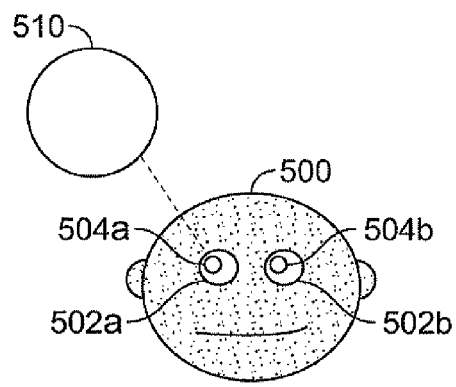
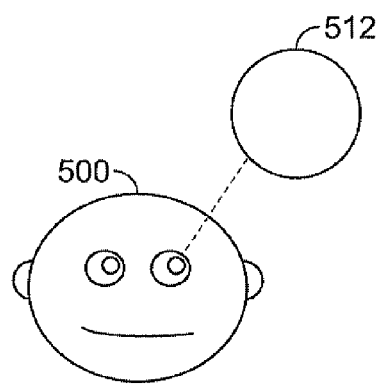
FIG. 6A                FIG. 6B
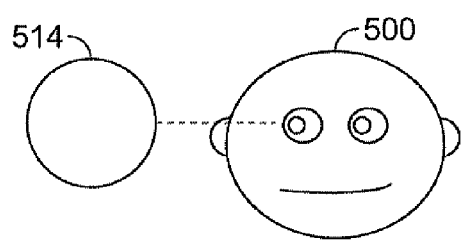
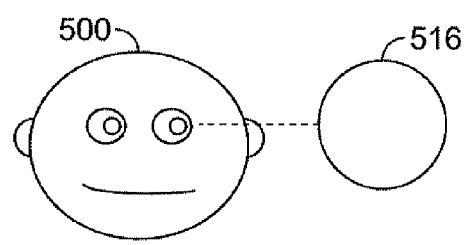
FIG. 6C                FIG. 6D
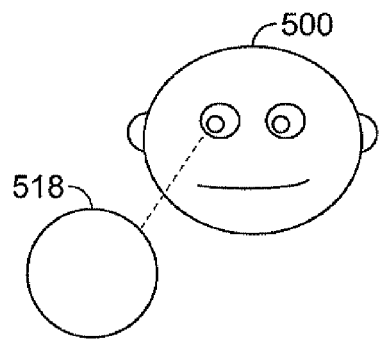
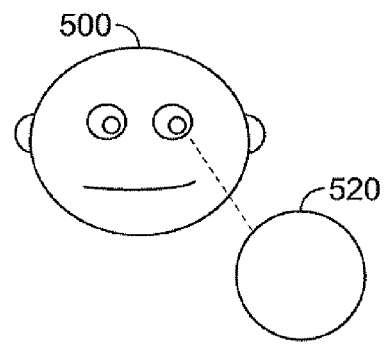
FIG. 6E                FIG. 6F

AVATAR EYE CONTROL IN A MULTI-USER ANIMATION ENVIRONMENT

CROSS-REFERENCE TO RELATED APPLICATIONS

This application is a continuation of U.S. application Ser. No. 12/141,474, filed Jun. 18, 2008, now U.S. Pat. No. 8,259,117, which claims priority pursuant to 35 U.S.C.§119(e) to U.S. provisional application Ser. No. 60/944,723, filed Jun. 18, 2007, which applications are hereby incorporated by reference in their entireties.

FIELD OF THE INVENTION

The present invention relates to computer-generated virtual environments in which participants are represented by computer-generated avatars, and in particular, to computer-generated virtual environments that simulate an actual 3-D environment and allow for simultaneous participation and interaction by multiple users in the virtual environment through the avatars.

BACKGROUND

Computer generated virtual worlds are becoming increasingly popular. In many of the computer generated virtual worlds, users interact with one another and participate in communities in the virtual world in real time through a networked system. Environments of this type are sometimes referred to as "virtual reality" or "virtual reality universe" (VRU) environments.

In known VRU environments, an actual or fantasy universe is simulated within a computer memory. Multiple players may participate in the environment through a computer network, such as a local area network (LAN) or a wide area network (WAN). Each player selects an "avatar" to represent them in the VRU environment. The avatar may be a three-dimensional embodiment of a man, woman, animal, or other entity. Players send inputs to the VRU engine to move their avatars around the VRU environment, and are able to cause interaction between their avatars and objects in the VRU. For example, a player's avatar may interact with an automated entity or person, simulated static objects or other avatars.

The VRU may take the form of at least one area or environment which is a virtual reality three-dimensional map existing in a computer memory, consisting of elements that may include but are not limited to representations of rooms, outdoor areas, exotic environments, objects, people, animals, robots, avatars, robot avatars, time elements, additional special elements, and activities. Users establish a presence in the VRU by creating or using an avatar, which is a three-dimensional representative of the user in the VRU, and which can be navigated by the user around various environments in the VRU. Single or multiple views of the VRU are displayed to the user on a computer display and user interface software as known in the art. Each user provides input to a computer controlling the VRU using an input device connected to a local node or client, which in turn is connected to the networked computer system. The VRU is shared by all players and participants using elements from the common memory.

The computer system is used to control the action of the avatars in response to user input. For example, avatars may be limited to simply observing the environment or area. But usually, avatars can interact with other avatars, objects, the environment (e.g., walls, floors, roads, lakes, etc.), and automated or robotic avatars within at least one environment.

One of the most challenging tasks of computer graphics is providing a realistic animation of the face and of voluntary and involuntary facial movements. A great deal of effort has been focused on facial movements that accompany speech, while the motions of certain other facial components, in particular eye and head movements, have largely been neglected. These two motions define the gaze behavior of the face. A person's gaze is one essential component of non-verbal communication and social interaction. Human beings generally monitor, either consciously or subconsciously, the eye and head movements of persons they are interacting with. In the real world, eye movement can be an important indicator of an internal emotional or mental state, providing an important stimulus for interesting face-to-face interaction. Adequate stimulus provided by eye movement is currently lacking in simulated face-to-face avatar interactions in VRU environments.

What is needed therefore is a system and method that can overcome these and other limitations of prior-art VRU environments.

SUMMARY

A multi-user animation system that receives input from multiple remote users to manipulate avatars through a modeled 3-D environment is disclosed herein. Each user is represented by an avatar. The 3-D environment and avatar position/location data is provided to the client workstations, which display a simulated environment visible to all participants. Non-player characters, objects and avatars in the VRU may be associated with a "visual attractiveness" characteristic value. Avatars or non-player characters in the VRU are programmed for simulated eye movement based on the attractiveness rating of objects within the avatar's simulated field of view. This creates more natural eye movements, so that avatars in the environment do not have a fixed stare, while freeing participants from the need to actively control eye movements.

In one embodiment, systems and methods are disclosed for animating an avatar's gaze. "Gaze" is used herein to mean an apparent direction in which an avatar's eye or eyes are fixed, whether momentarily or for a longer period. The avatar's gaze is animated to simulate a natural gaze pattern instead of a fixed gaze. Optionally, users may override autonomous gazing patterns of their avatars to manually control eye movements. A natural gaze pattern typically occurs when a subject views a scene without any specific task in mind, i.e., when the subject is simply watching the scene. In the systems and methods disclosed herein, the avatar's gaze pattern is controlled by the attractiveness value of visual targets in the avatar's defined the field of view.

In accordance with one aspect of the embodiment, a method comprises the steps of providing a digital representation of an avatar and a modeled scene in a computer memory, wherein the digital representation includes at least one modeled eye. A field of view for the modeled eye is determined, wherein the field of view encompasses visual targets in the modeled scene. The modeled eye is then directed to gaze at different selected visual targets in the field of view. The sequence in which the modeled eye gazes at the different visual targets is determined using a defined attractiveness value for each of the visual targets and a geometrical relationship between each visual target and the modeled eye. Data configured to cause a client computer to display a rendered view of the modeled scene and avatar is outputted onto a user's display or other suitable device. In accordance with another aspect of the embodiment, a computer-readable media encoded with instructions operative to perform these method steps are provided.

The avatar's field of view in a modeled scene is determined based on the orientation of the avatar in the scene, the forward facing direction of the avatar's eyes or line of sight, and the breadth of field angle relative to a line of sight. Thus, the avatar's field of view in the modeled scene may be changed by manipulating any one or more these factors such as, for example, by moving the avatar around in the modeled scene, by turning the avatar's eyes to a different direction, or by changing the angular extent of the avatar's field of view. The angular extent of the avatar's field of view may range anywhere from about 10° to about 365°, depending on the placement of the avatar's eyes relative to one another. For example, if the avatar has a pair of eyes on the same side of the head, resembling a human being, then that avatar's field of view may be about 180° in the forward facing direction of the avatar's eyes. On the other hand, if the avatar has a pair of eyes on opposite sides of the head, resembling a bird, then the avatar's field of view may be about 365°. Regardless of the placement of the avatar's eyes, the angular extent of the avatar's field of view may be a user-defined variable and therefore controlled and changed by the user.

Once the avatar's field of view is determined, the visual targets upon which the avatar may direct its gaze may be identified. The modeled scene typically contains a number of objects and other avatars, of which only those objects and avatars that at least partially fall within the avatar's field of view are considered visual targets. The visual targets may each be associated with an attractiveness or interest value, which determines the relative order in which the avatar will gaze at each of the visual targets. The attractiveness value may be a fixed predetermined numerical value or it may be calculated based on one or a sum of defined user preference numerical values. The visual targets may also be or become "dynamic visual targets" which are associated with a measure of movement, sound, or both. The avatar may thus be programmed to interrupt its gaze sequence to direct its gaze towards the dynamic visual targets. This simulates the natural reflex for humans and animals to look in the direction of movement and sound.

The avatar's eyes may be programmed to change its gaze upon various visual targets in a manner that simulates a natural gaze pattern in the modeled scene. The avatar's gaze pattern is transmitted to the displays of other players having avatars in the same modeled scene so that they may also observe and interpret the avatar's gaze pattern.

Other objects, features and advantages of the present invention will become apparent to those skilled in the art from the following detailed description.

BRIEF DESCRIPTION OF THE DRAWINGS

FIGS. 6A-F is a front view of the avatar's face depicting movement of the avatar's eyes towards visual targets in a sequence according to attractiveness value.

Like numerals refer to like parts throughout the several views of the drawings.

DETAILED DESCRIPTION OF EMBODIMENTS OF THE INVENTION

Various systems and methods for providing a three-dimensional, multiplayer interactive animation to multiple players are known in the art, or may be adapted by one of ordinary skill for use with the system. For example, rendering of a scene may be performed at the client or server level. Generally, it may be advantageous to perform calculations and graphics operations, to the extent possible, at the client level, thereby freeing up network bandwidth and minimizing loads on the server. The system disclosed herein is not limited to a particular hardware or software architecture for carrying out the steps described herein.

Figure 1:
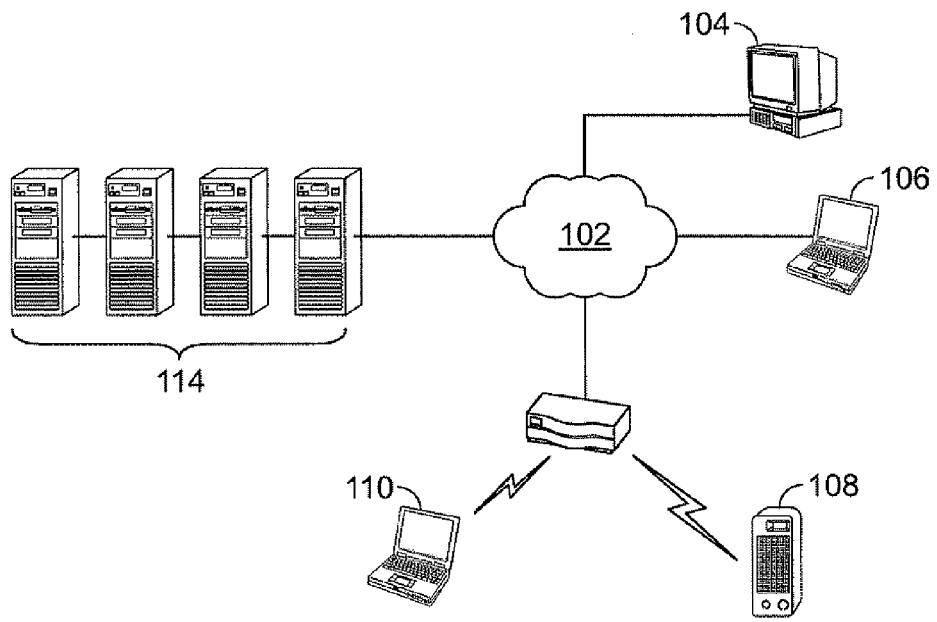
FIG. 1 is a schematic diagram showing a system according to an embodiment of the invention.

Referring to FIG. 1, a system 100 for providing a VRU to multiple users may comprise a plurality of client sites, nodes or terminals, such as a personal computer 104, portable computers 106, 110, a compact player, cell phone or digital assistant 108, and/or a router 112 communicating via a WAN 102 to one or more servers 114. Servers 114 store and serve VRU data and software to the client sites. Software or firmware may also be located at each client site, configured to work cooperatively with software or firmware operating on servers 114. Generally, any number of users may be communicating with servers 114 for participating in the VRU at any given time. Servers 114 and any or all of clients 104, 106, 108, and 110 may store executable code and data used in the performance of methods as described herein on a computer-readable media, such as, for example, a magnetic disc, an optical disk, an electronic memory device, or other magnetic, optical or electronic storage media. Software data for use in performing the method may be provided to any or all client devices via a suitable communication signal for network 102.

Figure 2:
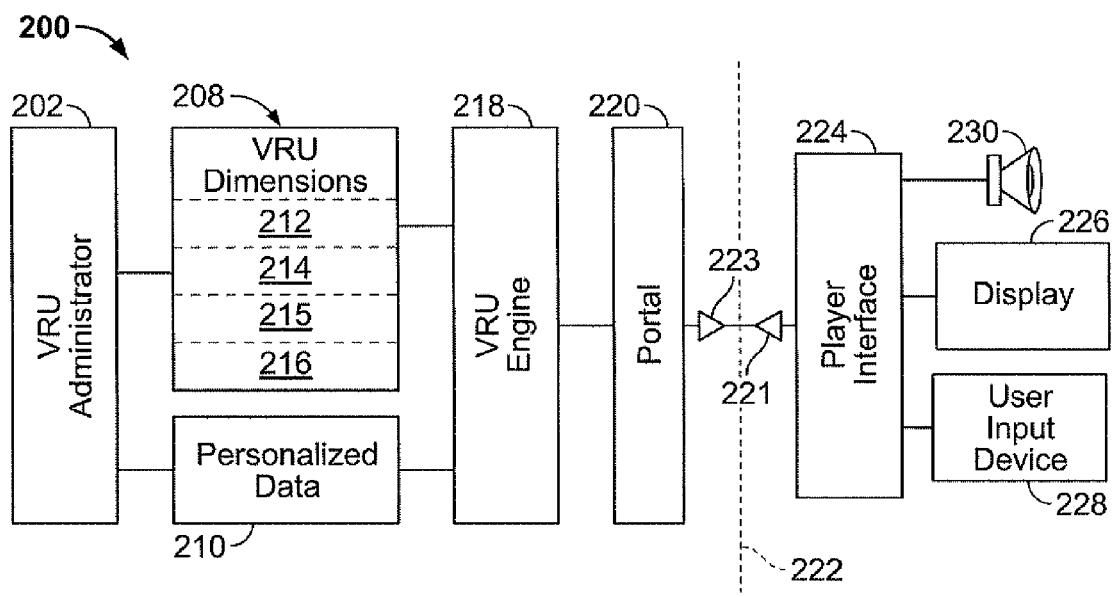
FIG. 2 is a schematic diagram showing a system according to another embodiment of the invention.

Referring to FIG. 2, a system 200 for providing a VRU process may be considered to be comprised of server-side components (to the left of dashed line 222) and client-side components (to the right of dashed line 222). Server-side components may comprise a portal 220 for managing connections to multiple simultaneous players. Portal 220 may interact with a VRU engine 218, passing user input 221 from multiple clients to a VRU engine 218, and passing data 223 from the VRU engine 218 to respective individual players. VRU engine 218 may be operatively associated with various memory spaces, including environmental spaces 208 holding two or more separate VRU environments 212, 214, 215, and 216, and a personalized or common data space 210.

Objects in a VRU are modeled as three-dimensional objects, or two-dimensional objects, having a defined location, orientation, surface, surface texture, and other properties for graphic rendering or game behavior. Environmental memory space 208 may hold active or inactive instances of defined spaces used in the VRU environment. For example, the environment of a popular simulated nightclub, shopping area, beach, street, and so forth. Personalized space 210 may be comprised of various different personal areas each assigned to a different user, for example, avatar or avatar accessories data. The VRU engine may operate with other memory areas not shown in FIG. 2, for example various data libraries, archives, and records not inconsistent with the methods and systems disclosed herein. In addition, or alternatively, portions of all data maintained in memories 208, 210 may be maintained by individual clients at a local level.

One function of the VRU engine 218 is to manage and aggregate input from multiple users, process that input to provide multi-participant animation scenes, and then prepare appropriate output data for animating or rendering scenes to be distributed to individual clients. To reduce system bandwidth requirements, it may be desirable to maximize the processing that is performed at the client level. Accordingly, the VRU engine may process and prepare high-level scene data, while lower-level functions, such as animation and rendering, may be performed by an application residing at the client level. For example, the VRU engine 218 may output object information to clients only when the object population of a scene changes. A copy of object parameters may be maintained locally while the object is located in a scene, and for some period of time afterwards.

Thus, the VRU engine 218 may provide a virtual three-dimensional environment, or a modeled scene, within a computer memory, which is displayed on the user's display 226. The modeled scene may simulate a region of space, for example, the surface of a planet or region thereof, the inside of a room or building, the surface of an island, and so forth. A modeled scene may be highly complex and may include a number of objects, such as signs, furniture, plants, other avatars, animals, robots, and any other object that takes up space in the modeled scene. Modeled scenes or spaces may be of different types, meaning they may be modeled according to different rules. They may be connected in that transportation between spaces may be allowed, at least for some avatars in the environment.

Each user may customize an avatar to have an appearance and qualities specified by the user, by choosing avatar characters, features, clothing and/or accessories from an online catalog or store. The particular arrangement selected by a user may reside in a personalized space 210 that is associated with a particular user, specifying which avatar elements are to be drawn from a common space to construct an avatar. A customized avatar instance may be stored in a personalized space 210 for the user. In the alternative, or in addition, a user may own customized elements of an avatar, including clothing, accessories, simulated physical powers, etc., that are stored solely in the personalized space 210 and are not available to other users. Avatars may move and interact both with common elements and personalized elements.

A separate administration module 202 may operate at the server level to create, update, modify or otherwise control the content of the VRU as defined in the memory areas 208 and 210. Generally, changes in the personal space area 210 are driven by individual users, either through the VRU administrator 202 or another module. Control of common areas, i.e., the game environment and the objects in it, including any multi-dimensional areas, may be via the administrator module 202.

At the client level, a player interface module 224 may be installed to receive player inputs from one or more user input devices 228, such as a keyboard, mouse or other pointer, or microphone, and provide data to the VRU engine 218 via portal 220 in response to the input. The player interface module 224 may also receive game data from portal 220 and process the data for display on display 226 and/or for audio output on speaker 230. Animation data, environmental data, chat data, executable code or any combination of the foregoing may be stored in a local memory. The VRU engine 218 also provides a rendering of a player's avatar in the modeled scene.

Figure 3:
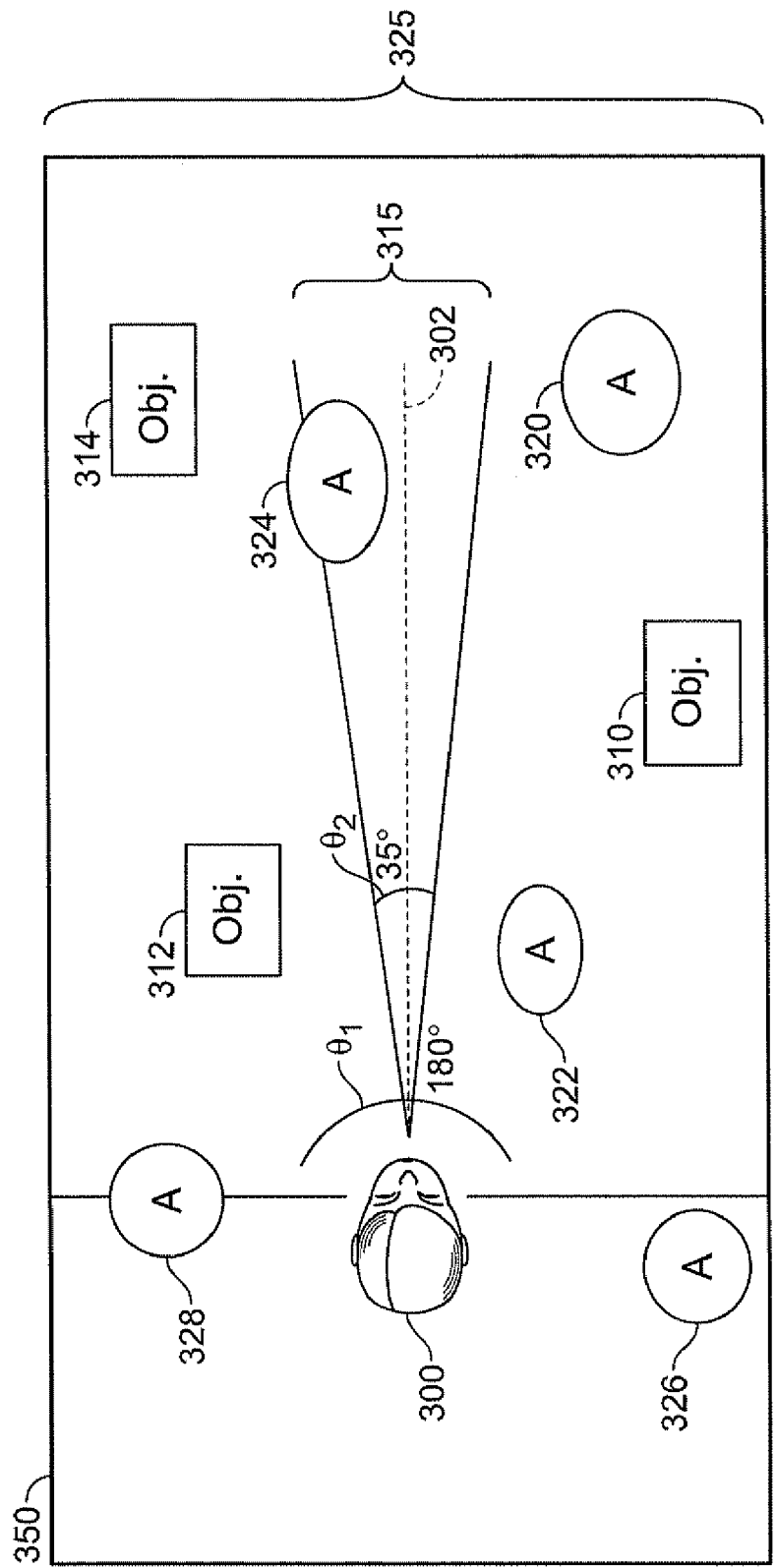
FIG. 3 is a top view representational drawing of an avatar in a modeled scene comprising various visual targets.

FIG. 3 depicts a top view of an avatar 300 in a modeled scene 350 containing other inanimate objects, 310, 312 and 314 and other avatars, 320, 322, 324, 326, and 328. Avatar 300 has a field of view which includes visual targets in the modeled scene. Although a modeled scene may contain a number of objects and other avatars, it is understood that visual targets refer only to objects and avatars which at least partially fall within the avatar's field of view. A field of view may be generally understood as portion or volume of the modeled space that is deemed visible to an avatar.

The avatar's field of view in a modeled scene 350 may be determined based on the orientation of the avatar's head, the forward facing direction of the avatar's eyes, and the breadth-of-field angle $\theta$. The line of sight 302 may comprise a vector originating from one modeled eye or from a point near the eye, and may be computed from the orientation of the avatar's head and an orientation of the pertinent modeled eye in the avatar's head. In some embodiments, a field of view may be related to two or more lines of sight and associated breadth-of-field angles, each pertaining to a modeled eye.

The avatar's field of view in the modeled scene 350 may be changed by manipulating any one or more of the avatar's orientation, forward facing direction (orientation) of eyes relative to the head, or the breadth-of-field angle $\theta$. The angle $\theta$ may be provided as a preset value or may be changed by the player. A field of view may be determined in any suitable fashion. In some embodiments, or at some times, it may be desirable for the field of view to be correlated to the orientation of the avatar's eyes so that the field of view changes when the avatar's eyes move. In the alternative, the field of view may be determined without using the orientation of the eyes, such as by using the orientation of the avatar's face or body, exclusive of the eyes. This may provide simpler yet still effective computation of the field of view. Also, leaving eye orientation out of a field of view determination may provide a more natural effect, particularly for large breadth-of-field angles such as 180°, in that the avatar's field of view may remain fixed until the user issues a command to move the avatar or turn its head. In either case, the user controlling the avatar may be given the avatar's view of the modeled VRU space, or may pick another viewpoint.

It should be understood that gaze control as described herein need not be used to determine viewpoints for rendering a modeled scene, although it is capable of being used in this way. Gaze control for an avatar may be implemented as completely separate from viewpoint selection for rendering purposes, merely to provide a more lifelike animated external appearance of the avatar. As such, movement of the avatar's eyes need not be related to the view of the modeled scene that the avatar's user sees on his or her display screen. While the apparent gaze of the avatar may change as the avatars eyes are modeled in different orientations, this need not affect the view of the space that the user sees or the field of view that is used to assess target objects.

A database of user preference data may be provided in the personalized space. The user preference data may comprise preference values for a particular avatar characteristic, such as gender, sexual orientation, race, hair color, eye color, body types, and clothes. The user preference data may also comprise preference values for objects, such as shape, size, color, texture, and any other object feature or characteristic. In addition, the user preference data may comprise preference values for user-defined features, characteristics, or objects. For example, a user whose avatar has a hobby of collecting books may define a high preference value for books that are in the avatar's field of view.

The extent of the avatar's field of view may be defined by the breadth angle $\theta$ relative to the line of sight 302. FIG. 3 depicts two possible fields of view 315 and 325, each defined by two different angles $\theta_1$ and $\theta_2$, about 35° and about 180°, respectively. The avatar 300 is depicted in FIG. 3 as having a set of two eyes 301a and 302b facing in the same direction. Therefore the avatar 300 may have a field of view that is closer to about 180°.

It is understood, however, that an avatar's field of view may range anywhere from about 5° to about 360°, depending on the placement of the avatar's eyes relative to each other and the player's preferences or selections. For example, a bird avatar may have eyes that are located on opposite sides of the head relative to one another and therefore a corresponding field of view that is closer to about 360°. Alternatively, the bird avatar may have a field of view that is set by the player.

Notwithstanding the location or position of the avatar's eyes, the angular extent θ of the avatar's field of view may be predetermined by the VRU administrator or set by the player. The larger the avatar's field of view, the greater the number of visual targets upon which the avatar 300 will need to process and direct its gaze. Thus, in certain instances, it may be desirable to limit the field of view to a smaller area in order to reduce the number of visual targets that the avatar will need to process and look at. On the other hand, selecting a wide field of view, such as about 180°, may facilitate embodiments in which the field of view is determined solely by the orientation of the avatar's head and is independent of eye orientation.

In one embodiment, the avatar 300 may be programmed by the player to have a 180° field of view 325. In accordance with this embodiment, the visual targets for the avatar 300 would include objects 310, 312, 314 and avatars 320, 322, 324, and 328. Although avatar 328 is only partially within the field of view 325, avatar 328 is still considered a visual target. Avatar 326, however, is entirely outside of the field of view 325 and therefore would not be considered a visual target. In another embodiment, the avatar 300 may be programmed to have a smaller field of view, such as a 35° field of view 315. In accordance with this embodiment, the only visual target for the avatar 300 would be avatar 324, with the other objects in the modeled scene as existing outside of the avatar's field of view 315.

Because the avatar's field of view is defined by the angular relationship θ that is centered relative to the line of sight 302 in the forward facing direction of the avatar's eyes, changes in orientation or direction of the avatar in the modeled scene changes the avatar's field of view and therefore the visual targets contained within it. Determining the field of view for the avatar may be performed by server-side components, by client-side components, or both. Either the VRU engine or the player interface, or both, may determine the orientation and the forward facing direction of the avatar's eyes in the modeled scene and thus may determine a field of view for the avatar's eyes.

Visual targets, such as other avatars, may be associated with a measure of movement, sound or other time-dependent parameters. These visual targets may be referred to as "dynamic visual targets." Thus, in order to simulate the natural reflex to look at moving objects or to look in the direction of a noise or sound, avatar 300 may be programmed to prioritize its gaze to dynamic visual targets in the field of view, regardless of any predetermined or calculated attractiveness value. If multiple dynamic visual targets are competing for the avatar's attention, the avatar 300 may be programmed to prioritize its gaze based on the proximity of the dynamic visual targets to the line of sight 302. Therefore, the avatar 300 will look first at the dynamic visual targets which are closest to the line of sight 302.

Figure 4:
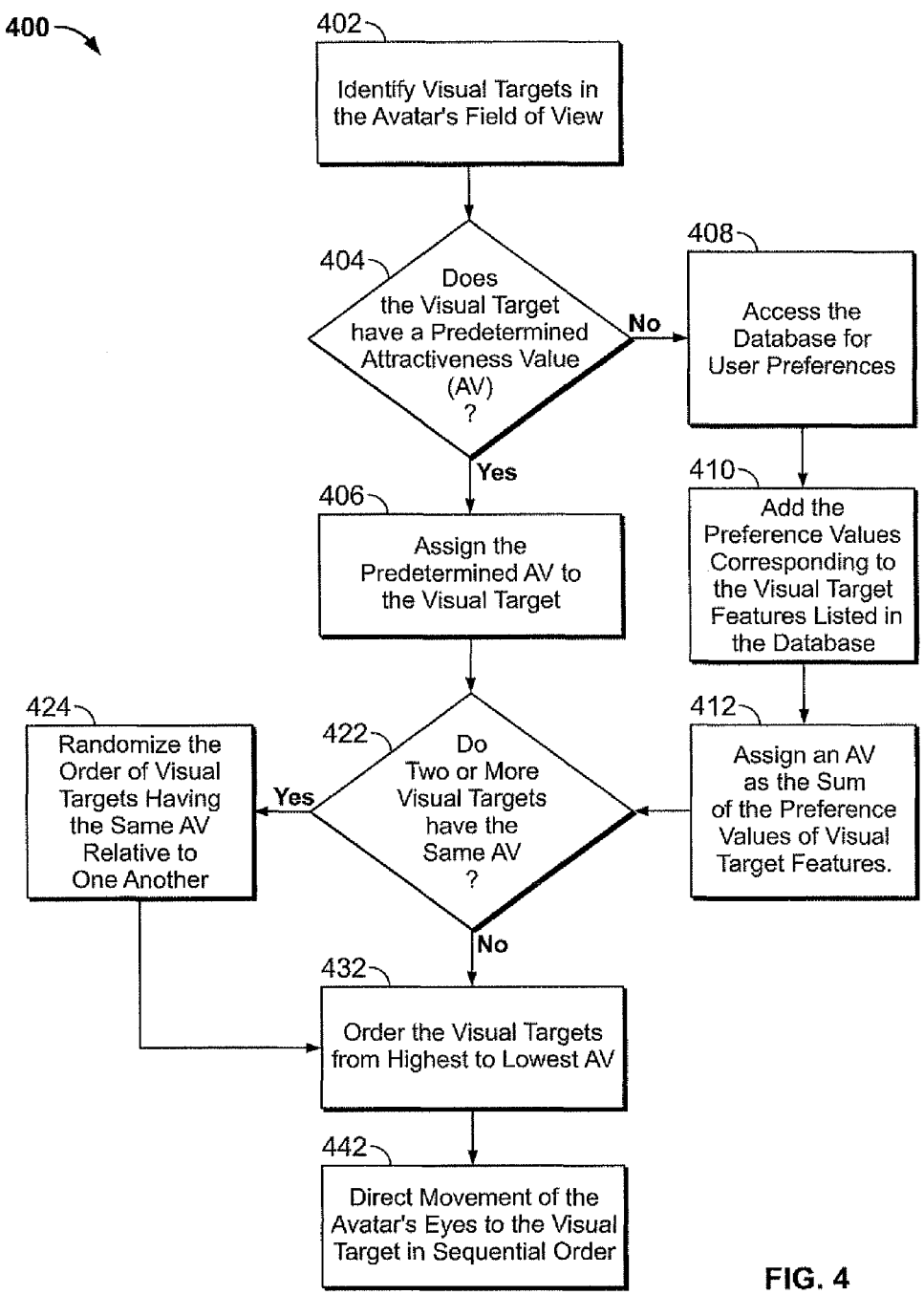
FIG. 4 is a flow chart showing exemplary steps of a method for animating an avatar's gaze in a modeled scene.

FIG. 4 is a flow diagram showing exemplary steps of a method 400 for directing the movement of an avatar's eyes to simulate a natural gaze pattern. Method 400 may be implemented by appropriate hardware and software such as described in systems 100, 200 herein. Once the field of view and the visual targets contained within the field of view are determined at step 402, the VRU engine 218 or the player interface 224 determines whether the visual targets have a predetermined attractiveness or interest value 404 and, if so, assign the predetermined attractiveness value associated to the visual target 406. If the visual target does not have a predetermined attractiveness value, then the attractiveness value may be calculated based on user preferences. In the alternative, a calculated value may be used in addition to a predetermined value. For example, visual targets may be prioritized based on a predetermined attractiveness value weighted by time-dependent factors such as the objects relative proximity to the observer, relative distance from the line of sight, speed, noise, and so forth. Generally, it may be desirable to assign a higher attractiveness or level of interest to nearby objects, objects closer to the line of sight, moving objects, and noisy objects. An algorithm may be used to determine these attributes of each visual target at selected times during modeling, and include them in determining attractiveness values.

The VRU engine or player interface may access the database for user preferences 408. User preferences may be used as a factor in weighting visual targets in a gaze priority list. The VRU engine or player interface may apply the preference values corresponding to the visual target features listed in the database 410. A calculated attractiveness value may be determined for each visual target by weighting the visual target features with the specific user preferences 412. For example, if a visual target has red hair and a user has indicated a preference for red hair, the red-haired target may be weighted more highly than targets with other hair colors.

After the attractiveness values for each visual target are assigned or calculated, a determination may be made as to whether two or more visual targets share the same attractiveness value 422. If so, then the relative order of these visual targets may be randomized 424. Otherwise, the visual targets may be prioritized from highest to lowest attractiveness value 432 and the movement of the avatar's eyes may be sequentially directed to each of the visual targets in that order 442, or in a random order. For example, the eyes may be directed at the most attractive target first, held there for a period proportional to its attractiveness value, then directed at the second-most attractive object, and so forth. Other gaze sequences may result in more natural effects. For example, an alternative sequence may be described as "1,2,1,3,1,4 . . ." and may comprise always returning the avatar's gaze to the most attractive target in the field after looking away. In this type of sequence, the order in which the secondary objects are gazed at need not be in order of attractiveness although the duration of gaze may still be related to target attractiveness. For example, a sequence of "1,7,1,3,1,2 . . ." may provide a natural effect, with every-other target, i.e., the non-principal targets, selected in a random sequences.

The duration that the eye gazes at a specific visual target may be determined according to a determined relative attractiveness value. Generally, the higher the attractiveness value of an object, the longer the avatar may be modeled as if gazing at that object. Likewise, if an object is relatively unattractive or uninteresting, or if its interest level is high for only a brief period, than the duration of the avatar's apparent gaze towards it may be correspondingly brief. Providing an appropriately-weighted gaze duration for each target object may be important for achieving a natural effect, perhaps even more so than determining a gaze sequence.

As an avatars view wanders, different objects may enter the field of view. Also, different objects may enter and leave the field of view by their own movement. Attractiveness values may be recalculated at different times and rankings may change. Such changes may draw the avatar's eyes away from what the user is most interested in looking at, or cause a distracting "wandering eye" effect. To prevent an undue amount of gaze wandering, various limits may be employed. One limit may include fixing the field of view irrespective of eye movement. In such case, the field of view does not change even as the avatars eyes move, and appear to move to other avatars. To change the field of view, the user may be required to provide some command input, such as command input for moving the avatar's head or body. However, to other users, the avatars eyes would appear to move, even when its field of view is actually fixed. This may provide a somewhat natural effect for situations such as conversing with other avatars. In such circumstances, the end user, much like his alter-ego the avatar, may look at different objects in the field of view but generally would not change the overall field of view until the conversation was over and the user issued a command to turn away. Another useful limit may be to limit rapid eye movements, to limit movements away from a central line of sight, or to cause eye movements to return to a previous principal line of site after looking away.

Referring back to FIG. 2, predetermined attractiveness values for visual targets may be stored in the environmental memory space 208, the personalized space 210, or in a separate memory area associated with the VRU engine or residing at the local client level. The database of user preference data may be stored in the personalized space 210 or in a memory area associated with the VRU engine or residing at the local client level.

The user preference data may include numerical preference values for particular avatar features, such as gender, sexual orientation, race, hair color, eye color, body types, and clothes. The user preference data may also comprise preference values for particular objects or object features, such as shape, size, color, texture, and any other object attribute. In addition, the user preference data may comprise preference values for user-defined features, characteristics, or objects. For example, a user whose avatar has a hobby of collecting books may define a high preference value for books. This may cause the avatar to glance first at any books that appear in the avatar's field of view. This type of behavior may add interest to the VRU environment by providing a subtle signal of what a user's interests are. By observing another avatar's eye movements in different situations, a user may receive clues as to the preference settings of the user that the avatar belongs to.

The attractiveness or interest value for a visual target may be represented as a single numerical value. If a visual target does not have a predetermined attractiveness value assigned to it, the visual target may be assigned an attractiveness value based on user preference data for certain characteristics. For example, the database of user preference data may comprise a feature listing and corresponding numerical values generally reflecting the extent of the user's preference for the particular feature. The attractiveness value assigned to the visual target is the sum of the preference values for all of its features which are provided in the user's preference.

Table 1 shows one example of how user preference data preference may be provided for female avatar features.

TABLE 1

| User Preference Data: FEMALE AVATAR | |
|---|---|
| Feature | Preference Values |
| Gender | |
| Female | 10 |
| Sexual orientation | |
| Heterosexual | 5 |
| Homosexual | 4 |
| Race | |
| No preference | 0 |
| Hair color | |
| Blonde | 10 |
| Brown | 5 |
| Eye color | |
| Blue | 5 |
| Brown | 3 |
| Body type | |
| Slender | 8 |
| Clothes | |
| None | 20 |
| Lingerie | 15 |
| Dress | 10 |
| Skirt | 5 |

Thus, in accordance with the user preference data provided in Table 1, a female, heterosexual avatar with blonde hair, blue eyes, slender body type, and wearing lingerie may have an attractiveness value (AV) of 53, if all factors are equally weighted. Similarly, user preference data may be provided for male avatars, animal avatars, and the like.

Additionally, user preference data may be provided for objects, categories of objects, or words. Table 2 shows one example of how user preference data preference may be provided for objects:

TABLE 2

| User Preference Data: OBJECTS | |
|---|---|
| Classification | Preference Values |
| Books | 5 |
| Automobiles | |
| Car | 20 |
| Motorcycle | 20 |
| Telephone | 15 |
| Animals | |
| Dogs | 10 |
| Rats | −10 |
| Words | |
| JENNIFER | 50 |
| LOVE | 10 |

As can be seen in Table 2 above, the user preference data may include objects to which the avatar has a strong preference or aversion to. In addition, the user preference data may include words which will command the avatar's attention when the they are, for example, printed on a sign or spoken by other avatars. For example, Table 2 may include the avatar's name, in this case "Jennifer," or certain other buzz words which would pique the avatar's interest, such as "Love." The high preference value assigned to the word "JENNIFER" make it likely that the avatar will gaze first in the direction where this word appears or from which the word is spoken by another avatar.

Preference values may be provided as positive whole numbers to reflect the extent of the avatar's preference for a particular object, or as negative number to reflect the extent of the avatar's aversion or lack of interest for a particular object. In certain instances, objects or avatar features to which the avatar may have a strong aversion may be associated with a high positive preference value such that the avatar takes notice of such object of avatar features when it comes into the avatar's field of view. This mimics a typical human response in which one's attention may be directed to groteseque objects or events. In other words, a more general understanding of "attractiveness value" is "interest value." As used herein, attractiveness refers to visual interest of all types, not just in objects that are pleasant to look at.

In the event that a particular avatar or object does not have a predetermined attractiveness value or any preference values associate with its features, a default attractiveness value may be assigned to the avatar or object. Again, the default value may be any value, such as zero 0, and may be set by the VRU administrator or by the player.

After the attractiveness values for each of the visual targets are determined, the VRU engine or the player interface may cause the avatar's eyes to move in a manner that simulates a natural gaze pattern. The avatar's gaze pattern is transmitted to other players having in the modeled scene so that they may also observe the avatar's gaze pattern. The movement of the avatar's eyes may be directed to the visual targets in sequence based on the attractiveness value and the geometric relationship between the visual targets. The attractiveness value for a visual target may be predetermined or it may be determined based on user preference data that is applied to the visual targets.

Referring back to FIG. 2, if the movement of the avatar's eyes is executed by client-side components, then the player interface 224 may then transmit the data 221 relating to the avatar's eye movements through the portal 220 and to the VRU engine 218 such that the data 221 may be outputted to the displays for the other players in the modeled scene. If the movement of the avatar's eyes is executed by server-side components, then the data relating to the avatar's eye movements may simply be outputted to the displays for the other players through the portal 220. In both embodiments, players with avatars are able to visualize the gaze patterns of other avatars in the same modeled scene to provide a more realistic of life-like appearance.

Figure 5:
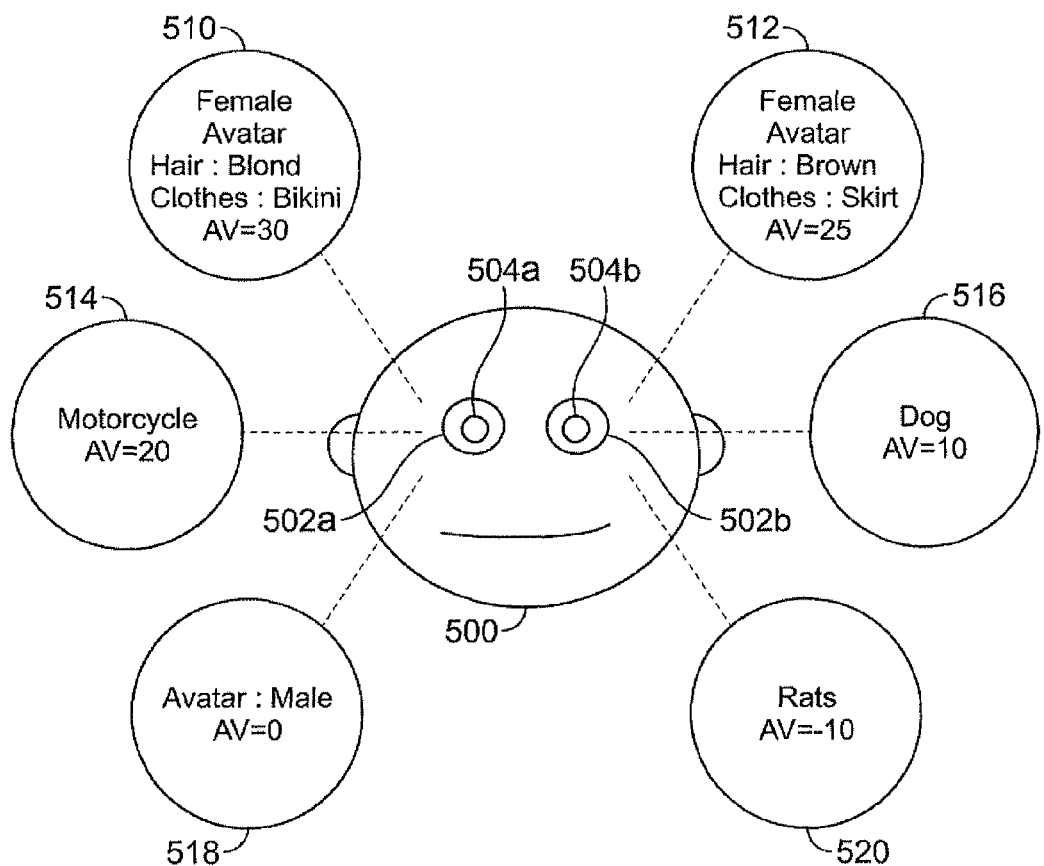
FIG. 5 is a front view of an avatar's face with visual targets in the avatar's field of view.

FIG. 5 is a simplified front view of an avatar's face 500 with exemplary visual targets 510, 512, 514, 516, 518, and 520 in the avatar's field of view. The avatar's face 500 includes a pair of eyes 502a,b each having a darkened center 504a,b which represents the iris/pupil of the avatar's eyes. It should be understood that the avatar is represented in a simplified, flat form for illustrative clarity. In many VRU applications, the avatar may have a more detailed, three-dimensional appearance, and may be modeled as a three-dimensional object, as known in the art.

Each of the visual targets may an attractiveness value (AV) associated with it based on the user preference values as provided in Tables 1 and 2. As shown in FIG. 5, the avatar's eyes 502a,b are depicted with a fixed forward stare which gives no indication of the avatar's awareness of the visual targets in the avatar's field of view. Since the movement of the eyes 502a,b is tracked by the movement of the darkened centers 504a,b, an avatar will have the appearance of having a fixed, blank stare if there is no movement of the darkened centers 504a,b. This is undesirable, as this lack of eye movement imparts an artificial or lifeless appearance to the avatar.

In contrast, FIGS. 6A-F show exemplary eye movements of the avatar 600 in accordance with the attractiveness values provided for the visual targets in the avatar's field of view. As depicted in FIGS. 6A-F, the gaze direction of the avatar's eyes 502a,b is tracked by the movement of the darkened centers 504a,b. Thus, the avatar 500 may direct its apparent gaze to a particular visual target by moving the darkened centers 504a,b of its eyes 502a,b in the direction of the visual target, as indicated by the dotted lines. FIGS. 6A-F show an exemplary sequence in which the avatar 500 may direct its gaze towards the visual targets is provided in order of highest to lowest AV, in this case 510, 512, 514, 516, 518, 520. In accordance with this embodiment, the location of the avatar's eyes and the location of the visual targets may represented by a set of coordinates, e.g., (x, y, z), in the modeled space. The direction of the avatar's gaze towards a particular visual target may comprise a vector originating from an eye and pointed in the direction of the visual target.

Figure 7:
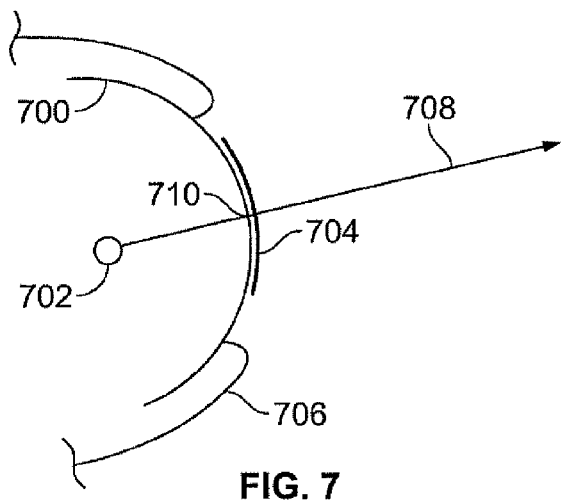
FIG. 7 shows and schematic cross-sectional view of an exemplary modeled eye.

With reference to FIG. 7, each avatar eye may be modeled as three-dimensional convex surface 700 with freedom to rotate spherically around a defined point 702 relative to a surrounding avatar skin 706. In the alternative, the avatar and/or eye may be modeled as solid objects. The eye surface 700 may be associated with a surface texture providing a dark region 704 representing a pupil and iris in the middle of a light region resembling eye white. A view direction vector 708 may be defined by pivot point 702 and a center point 710 associated with a center of the dark region 704, which may be used to determine an orientation of the eye. A VRU module at the local or server lever may cause an avatar to assume an apparent gaze towards an object by rotating the eye surface 700 so that the direction vector 708 is pointed at the viewed object. Various other methods for modeling a movable eye with an apparent gaze direction may also suitable.

As noted above, the avatar's field of view may or may not be the same as the player's field of view as provided in the rendering of the modeled scene that is seen on the display. For example, the VRU engine may process and output onto the display a rendering of the modeled scene that reflects the avatar's field of view. Alternatively, the VRU engine may process and output a rendering of the scene which is entirely independent of the avatar's field of view. The player may be provided the option of choosing the type of view that is provided in the display, whether it be from the perspective of the avatar's field of view or from a third person perspective, and switching or alternating between views. Alternatively, the display may provide a split screen in which the two views are provided simultaneously.

Thus, in one embodiment, a viewpoint and gaze direction corresponding to the orientation of the modeled eye in the scene is determined and outputted to a client associated with the avatar. The client is configured for rendering the scene from the viewpoint and gaze direction and providing the rendered scene on the display. In accordance with this embodiment, the player is able to observe the modeled scene from the avatar's perspective. Thus, as the avatar's viewpoint and gaze direction is directed to a particular item in the modeled scene, this data is outputted to the client interface which renders that item in the modeled scene on the player's display. As the avatar's viewpoint and gaze direction changes according to the attractiveness value of the avatars and objects provided in the modeled scene, the changed viewpoint and gaze direction is again outputted to the client interface and rendered on the player's display.

Because modeled scene rendered on the player's display changes in accordance with the avatar's viewpoint and gaze direction, it may be preferable to control the length of time between display changes. This is because it would be undesirable for the player to have to view rapid sequential changes in the modeled scene on the display. Thus, in one aspect of this embodiment, the length of time may be manually controlled by the player by player inputs from one or more user input devices, such as a keyboard, mouse or other pointer or microphone. In another aspect of this embodiment, the length of time may be a predetermined length of time, such as, for example, 10 seconds before rendering the next scene change on the display. In the alternative, the length of time may be proportional to the attractiveness value of the target object being viewed.

In another embodiment, modeled scene outputted to the player interface and rendered on the display is independent of the viewpoint and gaze direction of the avatar's modeled eye. In accordance with this embodiment, the player views the modeled scene from a perspective other than the player's avatar, such as, for example from a bird's eye view or a third person perspective. The player may also be able to see the changing gaze patterns of the player's own avatar in the modeled scene.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A method for animating an avatar's gaze, the method comprising:
   providing a digital representation of an avatar including at least one modeled eye and a modeled scene in a computer memory;
   determining a field of view for the modeled eye of the avatar, wherein the field of view encompasses visual targets in the modeled scene;
   directing the modeled eye to gaze at different selected visual targets in the field of view in an automated sequence of changing gaze directions determined at least in part on respective attractiveness values for each of the visual targets;
   determining the respective attractiveness values based at least in part on predefined user preferences for specified characteristics of prospective visual targets; and
   outputting data configured to cause a client computer to display a rendered view of the modeled scene, avatar and modeled eye.

2. The method of claim 1, further comprising determining the respective attractiveness values based on a measure of movement of corresponding ones of the visual targets within the field of view.

3. The method of claim 1, further comprising determining the respective attractiveness values based on a measure of sound associated with the visual target.

4. The method of claim 1, further comprising determining the respective attractiveness values based on a geometrical relationship between each visual target and the modeled eye.

5. The method of claim 1, further comprising determining respective durations of gaze directed at each of the selected visual targets in the automated sequence, based on the respective attractiveness values.

6. The method of claim 1, further comprising including in the predefined user preferences values for any one or more of the specified characteristics selected from the group consisting of gender, sexual orientation, race, hair color, eye color, body type, and clothes.

7. The method of claim 1, further comprising fixing the respective attractiveness values for each visual target.

8. The method of claim 1, further comprising varying the respective attractiveness values for each visual target based on changing attributes of each visual target during modeling of the scene.

9. The method of claim 8, further comprising determining the attractiveness value based on a current location of the visual targets in relation to the avatar, wherein at least one of the visual targets and the avatar are in motion relative to one another.

10. The method of claim 1, further comprising determining the attractiveness value of the selected visual targets based at least in part on weighting features of the visual targets according to the predefined user preferences.

11. A non-transitory computer-readable storage medium encoded with instructions operative to cause a computer to perform the steps of:
   generating a digital representation of an avatar including at least one modeled eye and a modeled scene in a computer memory;
   determining a field of view for the modeled eye of the avatar, wherein the field of view encompasses visual targets in the modeled scene;
   directing the modeled eye to gaze at different selected visual targets in the field of view in an automated sequence of changing gaze directions determined at least in part on respective attractiveness values for each of the visual targets;
   determining the respective attractiveness values based at least in part on predefined user preferences for specified characteristics of prospective visual targets; and
   outputting data configured to cause a client computer to display a rendered view of the modeled scene, avatar and modeled eye.

12. The non-transitory computer-readable storage medium of claim 11, encoded with further instructions for determining the respective attractiveness values based on a measure of movement of corresponding ones of the visual targets within the field of view.

13. The non-transitory computer-readable storage medium of claim 11, encoded with further instructions for determining the respective attractiveness values based on a measure of sound associated with the visual target.

14. The non-transitory computer-readable storage medium of claim 11, encoded with further instructions for determining the respective attractiveness values based on a geometrical relationship between each visual target and the modeled eye.

15. The non-transitory computer-readable storage medium of claim 11, encoded with further instructions for determining respective durations of gaze directed at each of the selected visual targets in the automated sequence, based on the respective attractiveness values.

16. The non-transitory computer-readable storage medium of claim 11, encoded with further instructions for including in the predefined user preferences values for any one or more of the specified characteristics selected from the group consisting of gender, sexual orientation, race, hair color, eye color, body type, and clothes.

17. The non-transitory computer-readable storage medium of claim 11, encoded with further instructions for fixing the respective attractiveness values for each visual target.

18. The non-transitory computer-readable storage medium of claim 11, encoded with further instructions for varying the respective attractiveness values for each visual target based on changing attributes of each visual target during modeling of the scene.

19. The non-transitory computer-readable storage medium of claim 18, encoded with further instructions for determining the attractiveness value based on a current location of the visual targets in relation to the avatar, wherein at least one of the visual targets and the avatar are in motion relative to one another.

20. The non-transitory computer-readable storage medium of claim 11, encoded with further instructions for determining the attractiveness value of the selected visual targets based at least in part on weighting features of the visual targets according to the predefined user preferences.

* * * * *